(12) United States Patent
Briltz (10) Patent No.: US 8,246,822 B2
(45) Date of Patent: Aug. 21, 2012

(54) WATER TREATMENT APPARATUS

(76) Inventor: Raymond P. Briltz, Regina (CA)

( * ) Notice: Subject to any disclaimer, the term of this patent is extended or adjusted under 35 U.S.C. 154(b) by 715 days.

(21) Appl. No.: 12/372,223

(22) Filed: Feb. 17, 2009

(65) Prior Publication Data
US 2010/0038293 A1 Feb. 18, 2010

Related U.S. Application Data

(60) Provisional application No. 61/030,625, filed on Feb. 22, 2008.

(51) Int. Cl.
*B01D 21/00* (2006.01)
*B01D 21/08* (2006.01)
(52) U.S. Cl. ....... 210/205; 210/96.1; 210/199; 210/206; 210/219; 210/738; 366/168.1; 366/171.1; 366/172.1; 366/172.2; 366/181.1
(58) Field of Classification Search .................... 210/199
See application file for complete search history.

(56) References Cited

U.S. PATENT DOCUMENTS

| | | | | |
|---|---|---|---|---|
| 4,482,459 A | * | 11/1984 | Shiver | 210/639 |
| 4,710,290 A | | 12/1987 | Briltz | |
| 5,124,035 A | * | 6/1992 | Dunne et al. | 210/206 |
| 5,332,313 A | * | 7/1994 | Cimbalik et al. | 366/303 |
| 5,409,605 A | * | 4/1995 | Haley et al. | 210/199 |
| 5,900,154 A | * | 5/1999 | Henriksen | 210/703 |
| 5,902,487 A | * | 5/1999 | Pickering et al. | 210/709 |
| 5,905,855 A | * | 5/1999 | Klaiber et al. | 714/31 |
| 6,932,905 B2 | | 8/2005 | Briltz et al. | |
| 7,503,686 B2 | * | 3/2009 | Tarmann et al. | 366/173.1 |

* cited by examiner

*Primary Examiner* — Krishnan S Menon
(74) *Attorney, Agent, or Firm* — Ryan W. Dupuis; Kyle R. Satterthwaite; Ade & Company Inc.

(57) ABSTRACT

An apparatus for treating waste water comprises a mixing chamber including mixing members therein for mixing waste water and treatment chemicals therein and a separating chamber at the outlet of the mixing chamber for separating the flocculated contaminants and to provide a supply of clarified water. In a preferred embodiment, the chemicals are injected at sequential locations along an injection tube for sequential mixing of the chemicals with one another in the injection tube prior to the chemicals being injected and mixed into the mixing chamber for mixing with the waste water.

8 Claims, 6 Drawing Sheets

WATER TREATMENT APPARATUS

This application claims the benefit under 35 U.S.C. 119(e) of U.S. provisional application Ser. No. 61/030,625, filed Feb. 22, 2008.

FIELD OF THE INVENTION

The present invention relates to an apparatus for removing contaminants from water.

BACKGROUND

It is known to add various chemicals to waste water in settling tanks in which the chemicals act to flocculate the contaminants so that they can settle for collection at the bottom of the settling tank leaving clarified water to be removed from the top of the settling tank. Conventionally this takes several hours of settling so that the tanks must be very large in order to accommodate a significant flow through.

One arrangement intended to allow settling of the materials within a few minutes thus reducing the size of the equipment necessary is shown in the prior U.S. Pat. No. 4,710,290 to Briltz. This arrangement has achieved some success and provides a tubular mixing chamber into which the waste water is injected and within which is provided a plurality of chemical injectors at spaced positions along the length of the duct. Also along the duct is provided a plurality of mixing devices which rotate within the duct so as to ensure that the chemicals are properly mixed in the water. It will be appreciated that the mixing is highly important since it is necessary for the chemicals to mix intimately with the contaminants within the water to ensure that the flocculation occurs quickly in order to achieve the short dwell time within the system. Downstream of the mixing chamber is provided a settling tank which can be very small allowing a dwell time of only a few minutes in view of the fact that the highly effective mixing has previously occurred so that the flocculation occurs immediately the materials enter the settling tank.

U.S. Pat. No. 6,932,905 to Briltz et al discloses an improved water treatment apparatus includes a mixing tube through which the waste water passes for mixing into the waste water a plurality of chemicals for causing flocculation of contaminants. The mixing tube is connected to a settling chamber for allowing settling of the flocculated contaminants and for supplying clarified water at an outlet of the settling chamber. The mixing tube has a plurality of injection members at spaced positions along the duct, each including a pump and a chemical supply for injecting a selected quantity of a selected chemical into the duct and each including a respective mixing member and drive for mixing the chemical into the water in the duct. An electrical separation section is provided in the system before or after the settling and includes a duct, into which the water is introduced and a plurality of amorphous metal plates across the duct arranged to be charged at low voltage.

SUMMARY OF THE INVENTION

According to one aspect of the invention there is provided an apparatus for treating waste water, the apparatus comprising:

a mixing tube arranged for receiving the waste water therethrough from an inlet to an outlet;

a plurality of injection members, each arranged for injecting a selected quantity of a selected treatment chemical into the waste water in the mixing tube for causing flocculation of contaminants in the waste water;

a plurality of mixing members supported in the mixing tube and arranged for mixing the chemical into the waste water in the mixing tube; and a separating chamber connected to the outlet of the mixing tube so as to be arranged for receiving the waste water and the chemicals mixed therein and being arranged for separating the flocculated contaminants to supply clarified water at an outlet of the separating chamber;

an injection tube in communication with the mixing tube upstream from the mixing members;

the injection members being supported sequentially along the injection tube in communication therewith so as to be arranged for injecting the treatment chemicals into injection tube in sequence;

a plurality of auxiliary mixing members supported in the injection tube and arranged for sequentially mixing treatment chemicals injected by the injection members prior to mixing with the waste water in the mixing tube.

By premixing the treatment chemicals in a sequence prior to mixing with the waste water in accordance with the first aspect of the present invention, the treatment chemicals can be optimally activated and combined for their most effective treatment of the waste water contaminants.

The treatment chemicals injected into the injection tube may be arranged to be continuously mixed between the injection members and the mixing tube.

The treatment chemicals may alternatively be arranged to be mixed at spaced apart intervals along the injection tube prior to communication with the mixing tube.

The treatment chemicals may be injected into the injection tube in a continuous flow in which the treatment chemicals are continuously mixed between the injection members and the mixing tube.

The plurality of auxiliary mixing members in the injection tube and the mixing members in the mixing tube may be arranged to be commonly driven.

The injection members may be arranged to inject treatment chemicals at a peripheral wall of the injection tube.

There may be provided a carrier fluid in the injection tube into which the treatment chemicals are arranged to be injected prior to communication with mixing tube.

There may be provided a catalyst injector arranged to inject a catalyst into the mixing tube prior to communication of the mixing tube with the injection members.

The mixing members may be arranged to mix the treatment chemicals with the waste water continuously along a full length of the mixing tube between communication with the injection tube and the outlet of the mixing tube.

The mixing members may be arranged to mix the treatment chemicals with the waste water at spaced apart intervals along a length of the mixing tube between communication with the injection tube and the outlet of the mixing tube.

According to a second aspect of the invention there is provided an apparatus for treating waste waters the apparatus comprising:

a mixing tube arranged for receiving the waste water therethrough from an inlet to an outlet;

a plurality of injection members, each arranged for injecting a selected quantity of a selected treatment chemical into the waste water in the mixing tube for causing flocculation of contaminants in the waste water;

a plurality of mixing members supported in the mixing tube and arranged for mixing the chemical into the waste water in the mixing tube; and a separating chamber connected to the outlet of the mixing tube so as to be arranged for receiving the waste water and the chemicals mixed therein and being arranged for separating the flocculated contaminants to supply clarified water at an outlet of the separating chamber;

the plurality of mixing members being arranged along in the mixing tube in respective groups of mixing members, each group of mixing members including at least one of the injection members associated therewith;

a motor arranged for driving each group of mixing members;

each motor operating to drive the mixing members of the respective group of mixing members at a respective mixing rate independently of the other groups of mixing members;

the mixing rate of each group of mixing members being dependent upon the treatment chemical injected by said at least one of the injection members associated therewith.

By further providing independent motors which operate different groups of mixing members at different rates according to the treatment chemicals being added to each group, the mixing subsequent to injection of each treatment chemical can be customized in an optimal manner most suited to the chemical being added to ensure the chemicals treat the waste water in the most efficient manner.

Said at least one injection member associated with each group of mixing members may be arranged to inject treatment chemicals which differ from the treatment chemicals associated with any of the other groups of mixing members.

The mixing members within each group of mixing members are preferably closer to one another in an axial direction of the mixing tube than the mixing members between adjacent groups of mixing members.

The mixing members may be arranged to mix the treatment chemicals with the waste water continuously along a length of the mixing tube across the various groups of mixing members.

The various groups of mixing members may be supported for rotation about a common axis extending along a length of the mixing tube.

Each motor may be mounted outside of the mixing tube for communication through a wall of the mixing tube by a drive shaft coupled to a shaft supporting the mixing members thereon by a right angle joint.

The injection members may be arranged to inject treatment chemicals at a peripheral wall of the mixing tube.

There may be provided a catalyst injector arranged to inject a catalyst into the waste water in the mixing tube prior to communication with the injection members.

According to a third aspect of the invention there is provided an apparatus for treating waste water, the apparatus comprising:

a mixing tube arranged for receiving the waste water therethrough from an inlet to an outlet;

a plurality of injection members, each arranged for injecting a selected quantity of a selected treatment chemical into the waste water in the mixing tube for causing flocculation of contaminants in the waste water;

a plurality of mixing members supported in the mixing tube and arranged for mixing the chemical into the waste water in the mixing tube; and a separating chamber connected to the outlet of the mixing tube so as to be arranged for receiving the waste water and the chemicals mixed therein and being arranged for separating the flocculated contaminants to supply clarified water at an outlet of the separating chamber;

the plurality of mixing members being arranged along in the mixing tube in respective groups of mixing members, each group of mixing members including at least one of the injection members associated therewith;

the mixing members within each group of mixing members being closer to one another in an axial direction of the mixing tube than the mixing members of adjacent groups of mixing members.

By providing spaces between the groups of mixing members which are greater than the spaces between the individual mixing members within each group, differing spaces and time lapses can be provided in the mixing operation between the different treatment chemical injections to provide dwelling regions within the mixing tube where the chemicals are permitted to momentarily dwell within the waste water without mixing to allow the treatment chemicals to optimally react with the contaminants in the waste water.

The mixing members of each group of mixing members may be supported downstream relative to said at least one injection member associated with the group.

The groups of mixing members may be arranged to be commonly driven on a common shaft extending along a length of the mixing tube.

There may be provided a catalyst injector in communication with the mixing tube prior to communication with the injection members, the catalyst injector being arranged to inject a catalyst into the waste water prior to mixing with the treatment chemicals.

A space between adjacent groups of mixing members may be longer in an axial direction of the mixing tube than at least one group of mixing members.

The group of mixing members nearest to the outlet of the mixing tube may be longer in an axial direction of the mixing tube than any other one of the groups of mixing members.

The injection members may be arranged to inject treatment chemicals at a peripheral wall of the mixing tube.

According to a further aspect of the present invention there is provided an apparatus for treating waste water, the apparatus comprising:

a mixing tube arranged for receiving the waste water therethrough from an inlet to an outlet;

a plurality of injection members, each arranged for injecting a selected quantity of a selected treatment chemical into the waste water in the mixing tube for causing flocculation of contaminants in the waste water;

a plurality of mixing members supported in the mixing tube and arranged for mixing the chemical into the waste water in the mixing tube; and a separating chamber connected to the outlet of the mixing tube so as to be arranged for receiving the waste water and the chemicals mixed therein and being arranged for separating the flocculated contaminants to supply clarified water at an outlet of the separating chamber;

a plurality of monitoring devices in communication with the waste water in the mixing tube prior to the injection members and arranged to measure various parameters of the waste water;

the injection members being operable responsive to the parameters measured by the monitoring devices The injection members may be arranged to vary a quantity of treatment chemical injected into the mixing tube responsive to the parameters measured by the monitoring devices.

The injection members may be arranged to vary the type of treatment chemical selected responsive to the parameters measured by the monitoring devices.

According to a further aspect of the invention, monitoring devices can be used to which the injections members are responsive to ensure that the treatment chemicals being injected are always appropriate in type and quantity to the contaminants to be treated in the waste water. This ensures that sufficient chemicals are injected to sufficiently treat the contaminants in the waste water while also preventing an unnecessary excess use of chemicals which may not be needed when the level of contaminants in the waste water drops only momentarily in a continuous flow.

According to the various aspects of the waste water treatment apparatus described herein, a more resolute dilution of the chemicals can be achieved and which eliminates the need for injection of a catalyst in the pretreated affluent. Furthermore a greater fracturing and quicker blending action of each new injected treatment chemical can be achieved. The results are better density of the flocculation, a more effective timing to achieve flocculation, a higher clarity of the end product and a reduction in cost of materials.

Some embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Referring to the accompanying figures there is illustrated a waste water treating apparatus generally indicated by reference numeral 10. The apparatus 10 is particularly suited for removing contaminants from water by injecting treatment chemicals into the water for causing flocculation of contaminants in the waste water which can be separated to produce clarified water.

Although various embodiments are described and illustrated herein, the common elements of the various embodiments will first be discussed. In each instance the apparatus comprises a mixing tube 12 comprising a tubular duct which is arranged to receive the waste water flowing therethrough from an inlet 14 to an outlet 16 of the tube.

A plurality of injection members 18 are provided in communication with the waste water in the mixing tube for injecting treatment chemicals into the waste water. Each injection member includes a respective pump and chemical supply from which the treatment chemicals are provided for injection at a selected quantity. Suitable treatment chemicals are selected for each injector according to the type of contaminants in the waste water flowing through the tube. Each injection member is arranged for injecting chemicals at the wall of the tube upon which it is supported.

A plurality of mixing members 20 are supported on respective shafts 22 extending axially along a length of the mixing tube. The mixing members each comprise paddles or other suitable generally radially projecting members mounted for rotation with the shaft to provide mixing of the waste water for mixing the treatment chemicals into the waste water. The mixing members are driven to rotate by suitable variable speed mixing motors 24 supported externally of the tube for communication through the wall of the tube by a drive shaft which communicates between the shaft 22 of the mixing members and the motor. A suitable right angle joint, for example a gearbox or a universal joint, connects the drive shafts of the motors to the respective shafts 22 supporting the mixing members thereon.

The shafts 22 of the mixing members are supported by respective anchors 26 at axially spaced positions along a length of the tube. The anchors 26 serve to stabilize the shaft by projecting radially between the shaft and the surrounding tube walls. The anchors 26 include suitable bearings for rotatably supporting the shaft thereon.

A catalyst injector 28 is provided in communication with the waste water in the mixing tube at a location upstream and prior to communication of the injection members with the waste water in the mixing tube. The catalyst injector serves to inject a suitable catalyst into the waste water prior to communication of the waste water with the injected treatment chemicals to ensure favourable treatment by the chemicals.

Figure 1:
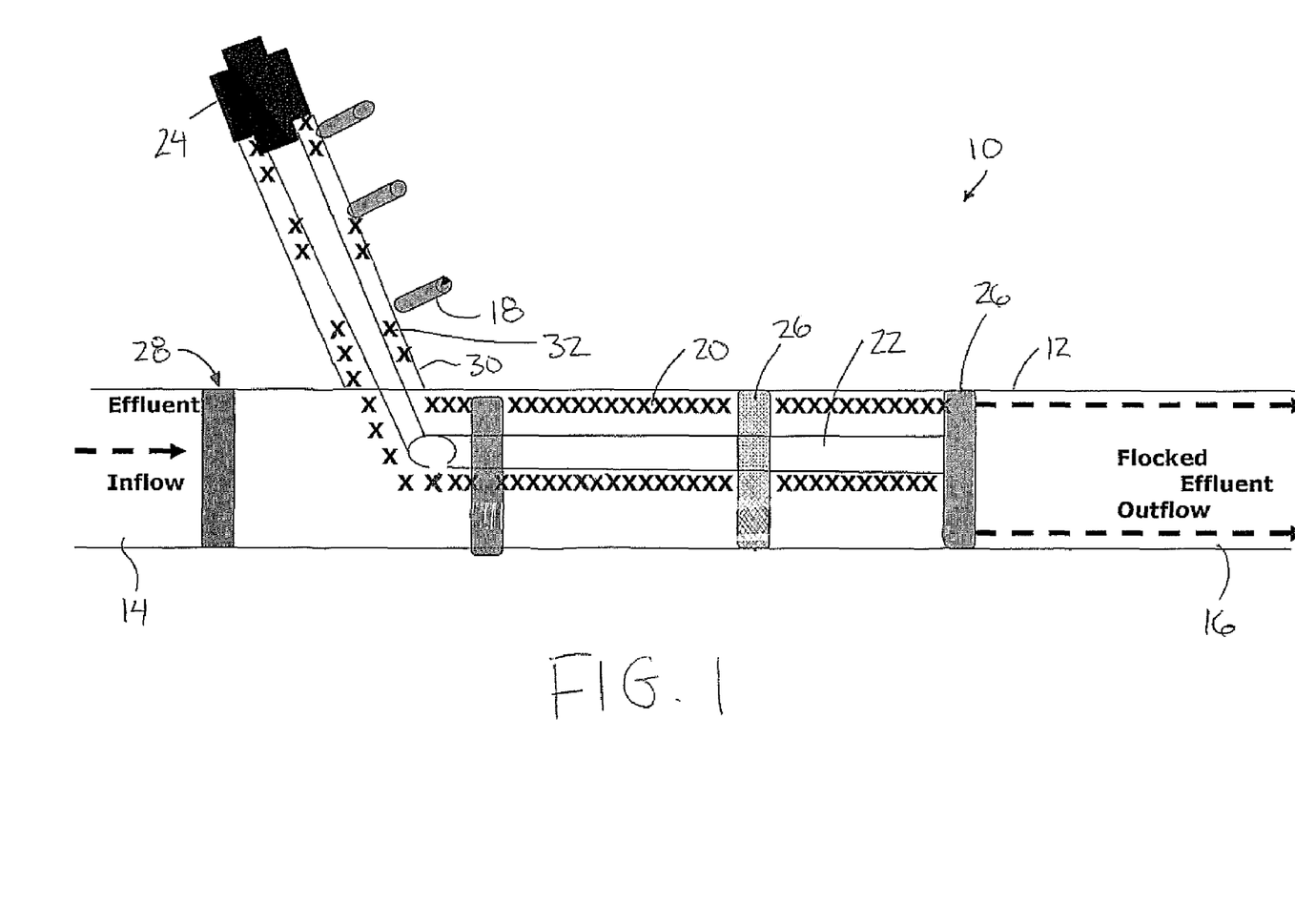
FIG. 1 is an elevational schematic representation of a first embodiment of the waste water treatment apparatus.
Figure 2:
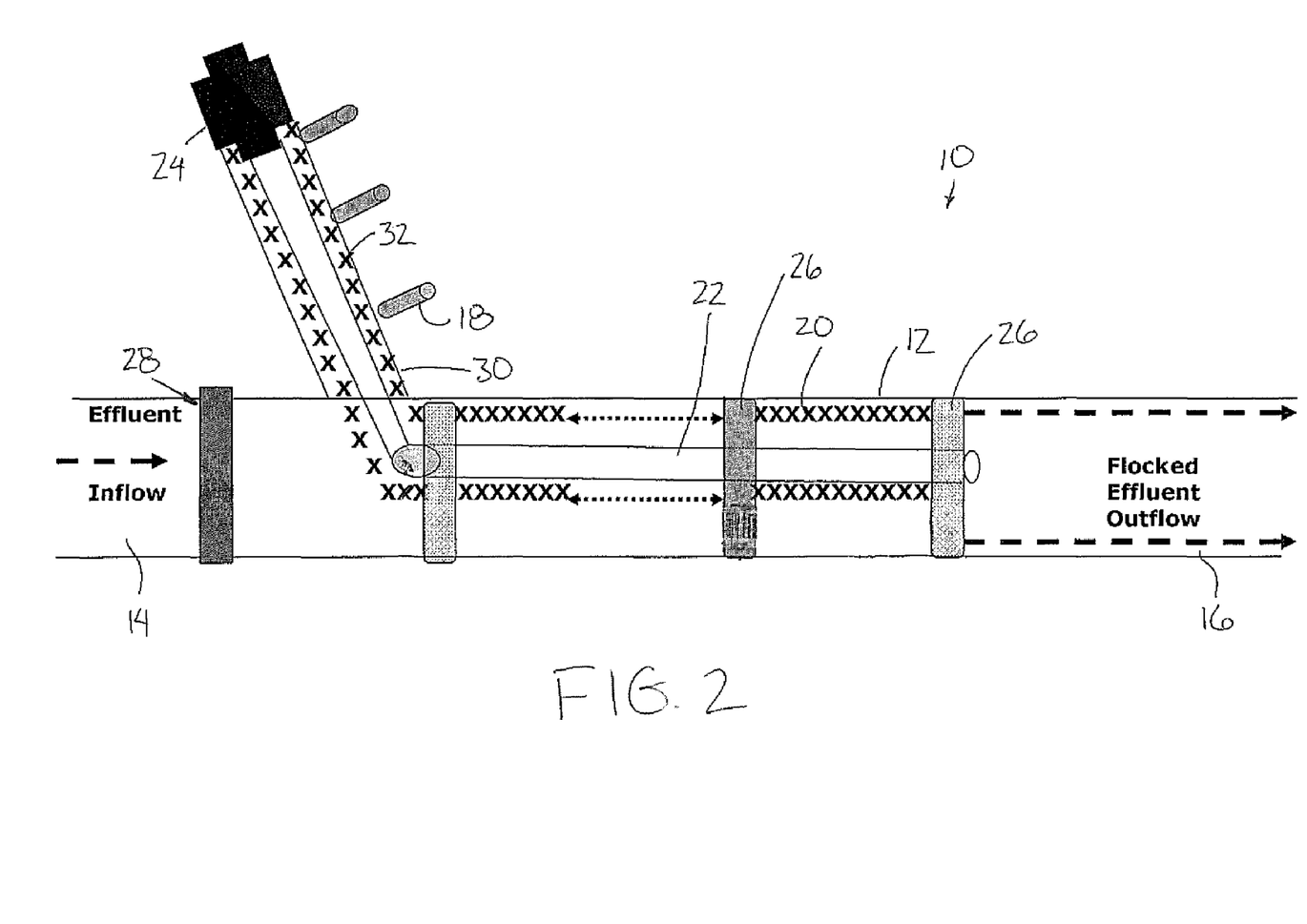
FIG. 2 is an elevational schematic representation of a second embodiment of the waste water treatment apparatus.
Figure 3:
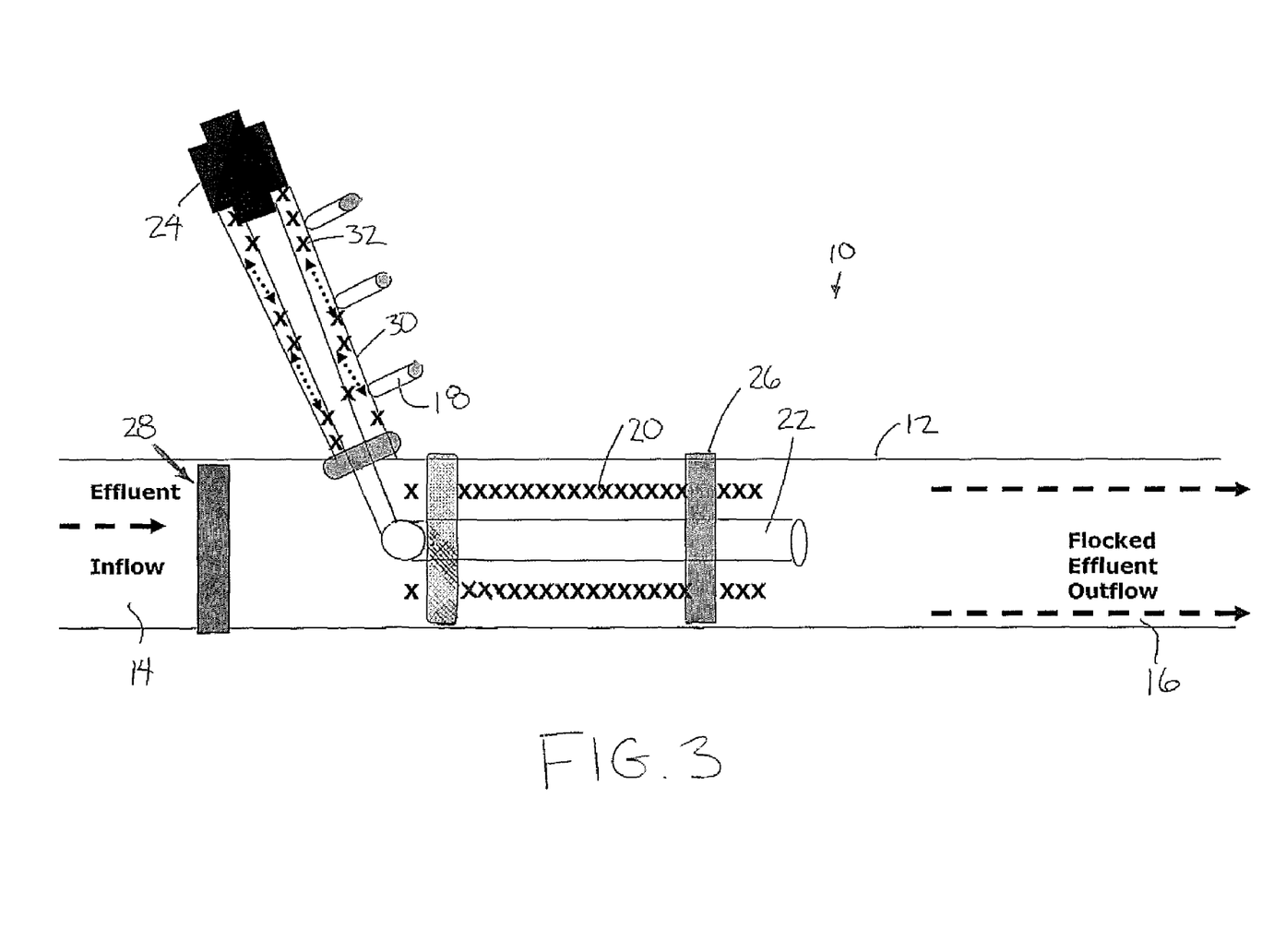
FIG. 3 is an elevational schematic representation of a third embodiment of the waste water treatment apparatus.

Turning now more particularly to the embodiments of FIGS. 1 through 3, the injection members 18 are shown supported along an injection tube 30 supported externally of the mixing tube for communication with the mixing tube between the catalyst injector and the mixing members 20 in the mixing tube. The injection tube 30 supports a plurality of injection members 18 at spaced positions sequentially along the length thereof so that the injection members are arranged to inject the treatment chemicals sequentially into a carrier fluid flowing through the injection tube and into the waste water in the mixing tube. The injection tube extends radially inward into the mixing tube so that the sequentially mixed treatment chemicals are injected into the waste water immediately subsequent to the sequential mixing thereof.

Within the injection tube 30 there is provided a plurality of auxiliary mixing members 32 supported for rotation along a shaft extending axially through the injection tube to assist in mixing the sequentially injected treatment chemicals in the carrier fluid flowing through the injection tube to be mixed into the mixing tube.

In the embodiment of FIG. 1, the auxiliary mixing members 32 are provided at spaced apart intervals corresponding to the intervals between the injection members 18 so that the injected treatment chemicals are only mixed immediately subsequent to each injection. The shaft supporting the auxiliary members 32 and the shaft 22 supporting the mixing members 20 in the mixing tube are arranged to be commonly driven by a single motor at the outer end of the injection tube by joining the shafts by a suitable variable angle joint. A much greater number of mixing members 20 at much closer spacing in the axial direction of the tube are provided along the length of the mixing tube than in the injection tube to gradually and sequentially mix the treatment chemicals together in the injection tube followed by rapid inline mixing of the pre-mixed treatment chemicals with the waste water in the mixing tube. The spaced apart intervals between the auxiliary mixing members in the injection tube provide an opportunity for the injected treatment chemicals to react with one another prior to mixing with the waste water in the mixing tube.

Turning now to the embodiment of FIG. 2, a similar configuration of injection tube 30 with auxiliary mixing members 32 therein and injection members 18 supported sequentially therealong is provided. The embodiment of FIG. 2 differs however in that the auxiliary mixing members 32 are provided continuously along a length of the injection tube for thoroughly mixing the treatment chemicals which are injected sequentially with one another along the length of the injection tube. Once the sequentially premixed treatment chemicals have been mixed together in the injection tube and are injected into the mixing tube, the mixing members 20 along the shaft 22 of the mixing tube are located at spaced apart intervals to define large gaps between groups of mixing members along the shaft where the premixed chemicals are permitted to react with the waste water with minimal or no mixing momentarily taking place at various intervals along the mixing tube.

Turning now to the embodiment of FIG. 3, the apparatus 10 is again provided with a similar configuration of an injection tube 30 locating auxiliary mixing members 32 therealong and supporting injection members 18 at sequential locations therealong for sequentially injecting the treatment chemicals for premixing in the injection tube prior to mixing with the waste water in the mixing tube. The embodiment of FIG. 3 is similar to the embodiment of FIG. 1 in that the mixing members 32 in the mixing tube are arranged to at spaced apart intervals corresponding to the spaced apart intervals between sequential injection members 18. The anchors 26 in the embodiment of FIG. 3 may be provided both at spaced positions along the shaft 22 in the mixing tube to support the shaft relative to the walls of the mixing tube while also being provided in the injection tube 30 to support the shaft of the auxiliary mixing members 32 relative to the walls of the injection tube.

Figure 4:
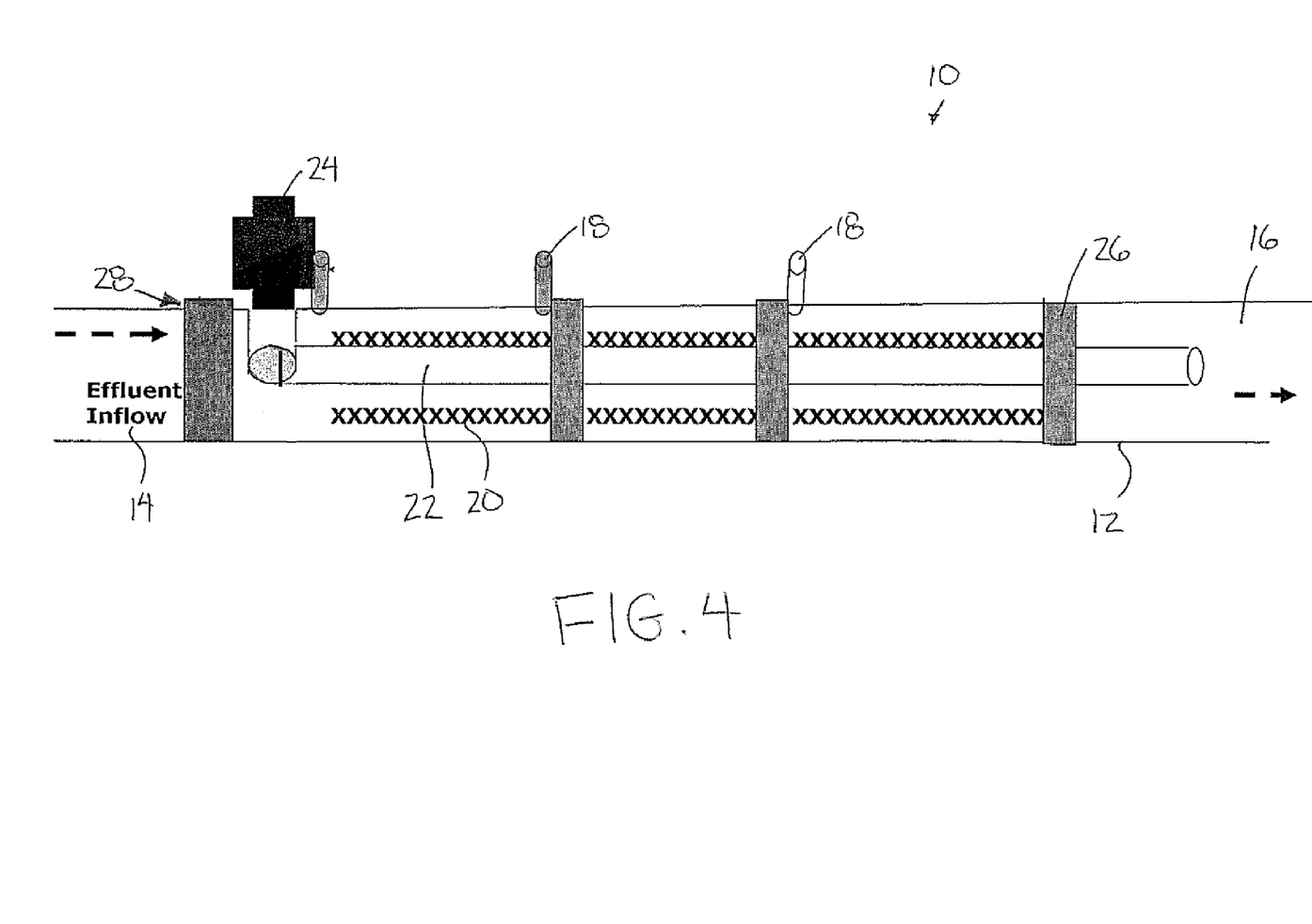
FIG. 4 is an elevational schematic representation of a fourth embodiment of the waste water treatment apparatus.

Turning now to the embodiment of FIG. 4, the injection members 18 are shown communicating directly through the wall of the mixing tube 12 at spaced positions therealong. The mixing members 20 are provided continuously along the length of the shaft 22 spanning evenly along the length of the mixing tube between injectors 18. The mixing members are all commonly driven on the shaft 22 by a single variable speed mixing motor 24. The catalyst injector 28 is again provided in communication with the mixing tube prior to communication with the injection members 18.

Figure 5:
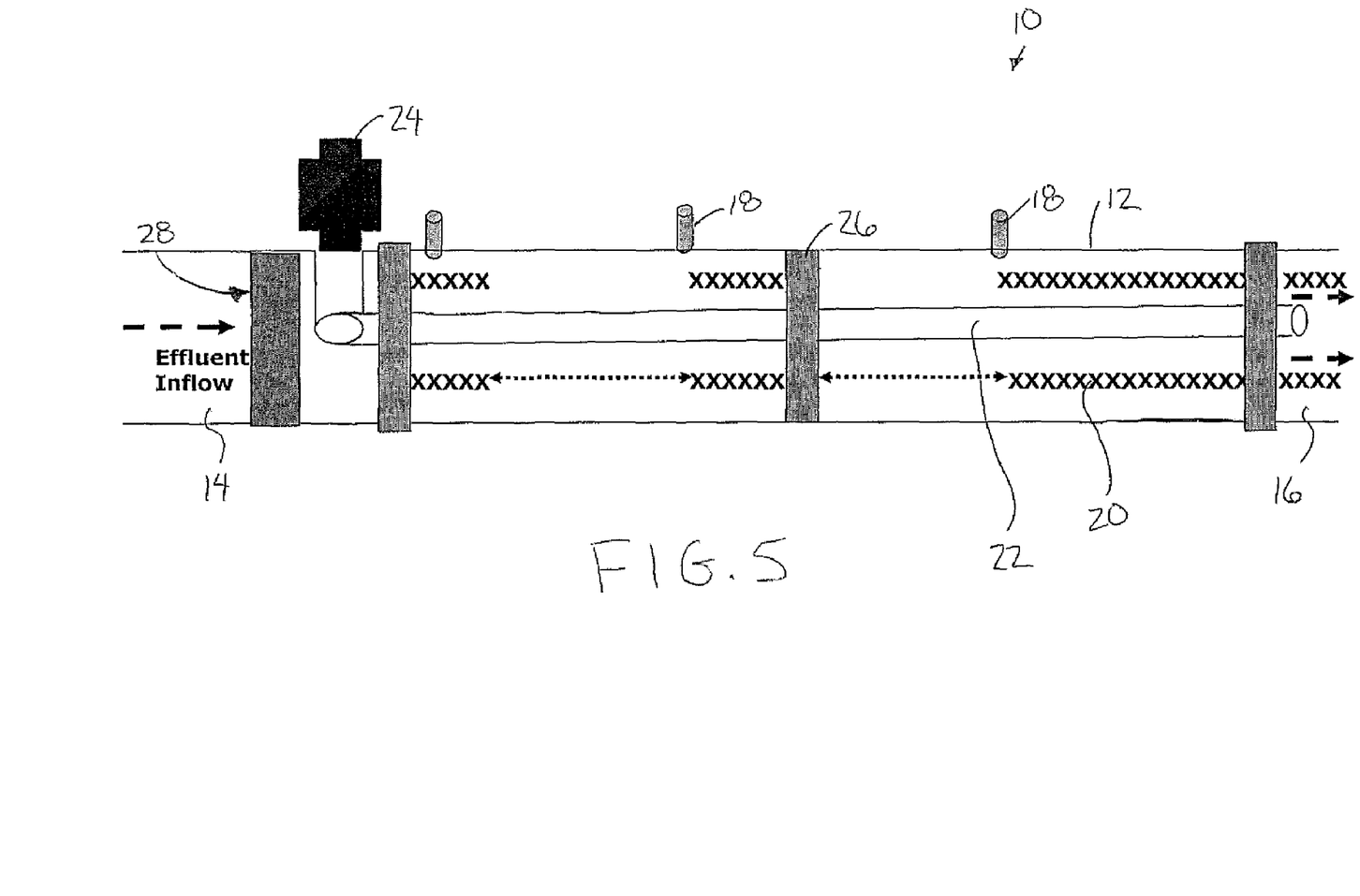
FIG. 5 is an elevational schematic representation of a fifth embodiment of the waste water treatment apparatus.

Turning now to FIG. 5, the injection members are again shown in communication directly through the wall of the mixing tube 12 at spaced positions therealong and the mixing members 20 are common supported on a common shaft 22 extending the length of the mixing tube. The mixing members in this instance are arranged along the mixing tube in separate groups of mixing members in which each group is associated with a single injection member. All of the mixing members of the group associated with one injection member are located downstream from the injection member. The mixing members within each group are arranged close to one another in an axial direction of the mixing tube with each group being spaced from other groups of mixing members by much greater distance in the axial direction of the mixing tube than the space between any two mixing members within a group. The space between adjacent groups of mixing members is arranged to be much greater than the length of either of the groups of mixing members adjacent the inlet end of the mixing tube. The group of mixing members adjacent the outlet end of the mixing tube however is much larger than any of the other groups of mixing members so as to most thoroughly mix any remaining unreacted treatment chemicals in the waste water with contaminants in the waste water prior to reaching the outlet of the mixing tube.

Figure 6:
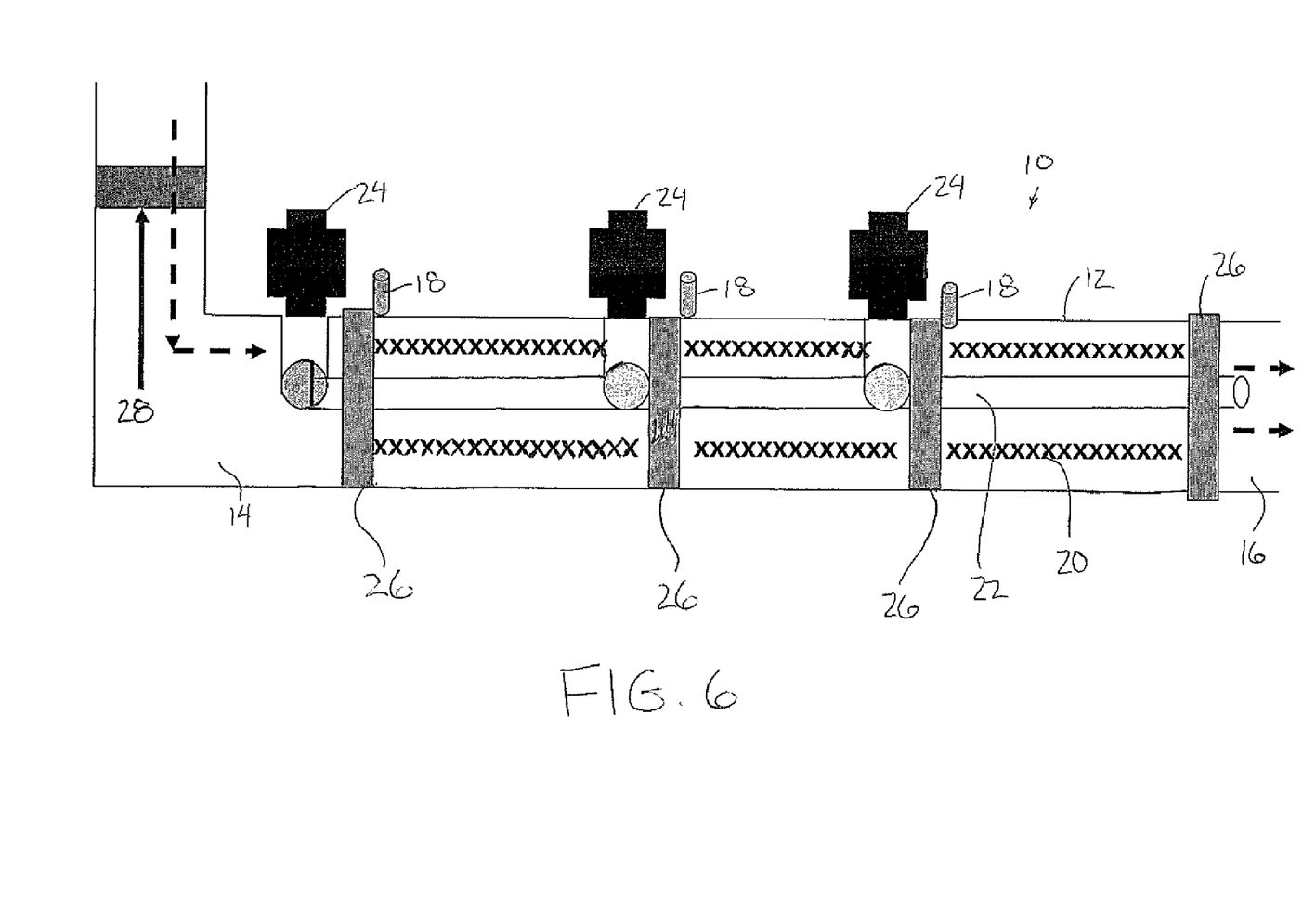
FIG. 6 is an elevational schematic representation of a sixth embodiment of the waste water treatment apparatus.

Turning now to FIG. 6 a further embodiment of the apparatus 10 is illustrated in which the mixing members are again arranged in respective groups in which each group is associated with a respective injection member for injecting a selected treatment chemical within each group of mixing members which is independent of the other groups. The embodiment of FIG. 6 differs from previous embodiments in that each group of mixing members along with the associated injection member includes its own independent shaft 22 supporting the mixing members thereon for rotation therewith in which the shaft 22 is driven by a respective motor 24. Each motor is operated at a respective mixing rate which is independent of the motors of the other groups of mixing members so that the mixing rate within each group of mixing members can be adjusted dependent upon the treatment chemical being injected by the associated injection member. Accordingly some groups of mixing members can be mixed at a reduced mixing rate where the treatment chemical being added benefits from a reduced mixing rate whereas other groups can be operated at greater mixing rates where the treatment chemicals added at those rates benefits from the greater mixing rate.

In further embodiments, monitoring devices are provided in communication with the waste water in the mixing tube adjacent the inlet thereof or at a location upstream from the mixing tube for measuring various parameters and qualities of the waste water flowing into the mixing tube in realtime. The injection members in this instance can be operable in realtime responsive to the parameters measured by the monitoring devices to either vary the amount of treatment chemical being injected or the selected type of treatment chemicals being injected.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An apparatus for treating waste water, the apparatus comprising:
    a mixing tube arranged for receiving the waste water therethrough from an inlet to an outlet;
    a plurality of injection members, each arranged for injecting a selected quantity of a selected treatment chemical for mixing with the waste water in the mixing tube for causing flocculation of contaminants in the waste water;
    a plurality of mixing members supported in the mixing tube and arranged for mixing the treatment chemicals into the waste water in the mixing tube;
    a separating chamber connected to the outlet of the mixing tube so as to be arranged for receiving the waste water and the treatment chemicals mixed therein and being arranged for separating the flocculated contaminants to supply clarified water at an outlet of the separating chamber;
    an injection tube including a carrier fluid received therein and being in communication with the mixing tube upstream from the mixing members;
    the injection members being supported at spaced positions along the injection tube in communication therewith so as to be adapted to sequentially inject the treatment chemicals into the carrier fluid in the injection tube prior to communication with the wastewater in the mixing tube; and
    a plurality of auxiliary mixing members supported in the injection tube and adapted to sequentially mix the treatment chemicals injected by the injection members in the carrier fluid prior to mixing with the waste water in the mixing tube.

2. The apparatus according to claim 1 wherein the treatment chemicals injected into the injection tube are arranged to be continuously mixed between the injection members and the mixing tube.

3. The apparatus according to claim 1 wherein the treatment chemicals are arranged to be mixed at spaced apart intervals along the injection tube prior to communication with the mixing tube.

4. The apparatus according to claim 1 wherein the treatment chemicals are injected into the injection tube in a continuous flow in which the treatment chemicals are continuously mixed between the injection members and the mixing tube.

5. The apparatus according to claim 1 wherein the plurality of auxiliary mixing members in the injection tube and the mixing members in the mixing tube are arranged to be commonly driven.

6. The apparatus according to claim 1 wherein the injection members are arranged to inject the treatment chemicals at a peripheral wall of the injection tube.

7. The apparatus according to claim 1 wherein the mixing members are arranged to mix the treatment chemicals with the waste water continuously along a full length of the mixing tube between communication with the injection tube and the outlet of the mixing tube.

8. The apparatus according to claim 1 wherein the mixing members are arranged to mix the treatment chemicals with the waste water at spaced apart intervals along a length of the mixing tube between communication with the injection tube and the outlet of the mixing tube.

* * * * *